United States Patent
Xi et al.

(10) Patent No.: US 12,315,089 B2
(45) Date of Patent: May 27, 2025

(54) AUGMENTED REALITY ERGONOMICS EVALUATION SYSTEM

(71) Applicant: Snap Inc., Santa Monica, CA (US)

(72) Inventors: Yubin Xi, San Jose, CA (US); Kai Zhou, Wiener Neudorf (AT)

(73) Assignee: Snap Inc., Santa Monica, CA (US)

( * ) Notice: Subject to any disclaimer, the term of this patent is extended or adjusted under 35 U.S.C. 154(b) by 166 days.

(21) Appl. No.: 18/069,779

(22) Filed: Dec. 21, 2022

(65) Prior Publication Data
US 2024/0212287 A1    Jun. 27, 2024

(51) Int. Cl.
*G06T 19/00* (2011.01)
*G06V 40/10* (2022.01)
*G06V 40/20* (2022.01)

(52) U.S. Cl.
CPC .......... *G06T 19/006* (2013.01); *G06V 40/103* (2022.01); *G06V 40/20* (2022.01)

(58) Field of Classification Search
CPC .... G06T 19/006; G06V 40/103; G06V 40/20; G06F 3/017; G06F 3/011
See application file for complete search history.

(56) References Cited

U.S. PATENT DOCUMENTS

2020/0133450 A1* 4/2020 Lu ..................... G06V 20/52

FOREIGN PATENT DOCUMENTS

WO    2024137521    6/2024

OTHER PUBLICATIONS

"International Application Serial No. PCT/US2023/084658, International Search Report mailed Apr. 24, 2024", 3 pgs.
"International Application Serial No. PCT/US2023/084658, Written Opinion mailed Apr. 24, 2024", 9 pgs.
"Jack 7.1-Siemens PLM Human Modeling and Simulation Tool", Emixa Industry Solutions, [Online]. Retrieved from the Internet: <URL: https://www.youtube.com/watch?v=OWnY1WCATml>, (Jan. 2, 2012), 2 pgs.
"A premier human simulation tool for populating your designs with virtual people and performing human factors and ergonomic analysis", [Online]. Retrieved from the Internet: <URL:https://www.plm.automation.siemens.com/media/store/en_us/4917_tcml023-4952_tcm29-1992.pdf>, (Jan. 1, 2017), 3 pgs.

(Continued)

*Primary Examiner* — Jeffery A Brier
(74) *Attorney, Agent, or Firm* — Schwegman Lundberg & Woessner, P.A.

(57) ABSTRACT

An ergonomics evaluation system for AR applications of an AR device is described. In one aspect, a method includes accessing user interface elements of an augmented reality application, accessing a plurality of user models and corresponding simulated augmented reality device sensor data for the plurality of user models, identifying simulated user interactions, from the plurality of user models, with a simulated augmented reality device operating the augmented reality application, based on the plurality of user models and corresponding simulated augmented reality device sensor data for the plurality of user models, applying a computer vision algorithm to the simulated user interactions, identifying user postures and user motions based on the simulated user interactions, and generating a first ergonomic feedback based on the user postures and the user motions.

20 Claims, 10 Drawing Sheets

(56) References Cited

OTHER PUBLICATIONS

Kim, Jeong Ho, "Evaluation of the biomechanical stress in the neck and shoulders during augmented reality interactions", Applied Ergonomics, Butterworth Scientific Ltd, Guildford, GB, vol. 88, (Jun. 11, 2020), 14 pgs.

Thaneswer, Patel, "Chapter 44: Virtual Ergonomics Evaluation of a Design Concept of Manual Powered Portable Paddy Thresher Suitable for Hilly Region Agriculture : Proceedings of ICoRD 2017", In: "Research into Design for Communities, vol. 1 : Proceedings of ICoRD 2017" vol. 65, [Online]. Retrieved from the Internet: <URL: https://link.springer.com/content/pdf/10.1007/978-981-10-3518-0_44>, (Jan. 1, 2017), 503-512.

Garrett, Gregory A, "Effects of Prolonged Use of Mixed Reality Systems in Occupational Settings", Proceedings of the Human Factors and Ergonomics Society 2018 Annual Meeting, (2018), 2104-2106.

* cited by examiner

AUGMENTED REALITY ERGONOMICS EVALUATION SYSTEM

TECHNICAL FIELD

The subject matter disclosed herein generally relates to an ergonomic evaluation system for augmented reality devices. Specifically, the present disclosure addresses systems and methods for simulating usage of augmented reality devices and generating ergonomic feedback.

BACKGROUND

An augmented reality (AR) device enables a user to observe a scene while simultaneously seeing relevant virtual content that may be aligned to items, images, objects, or environments in the field of view of the device. A virtual reality (VR) device provides a more immersive experience than an AR device. The VR device blocks out the field of view of the user with virtual content that is displayed based on a position and orientation of the VR device.

Physical effects from extended use of AR/VR device can be postural, repetitive, due to the weight and adjustment of the devices. Other effects of VR immersion include disorientation and collisions with the physical environment. Other examples of extended use of AR devices include more physical activities during user interactions (e.g., games, fitness application). It is therefore desirable to address safety and health implications of extended uses of AR/VR devices.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
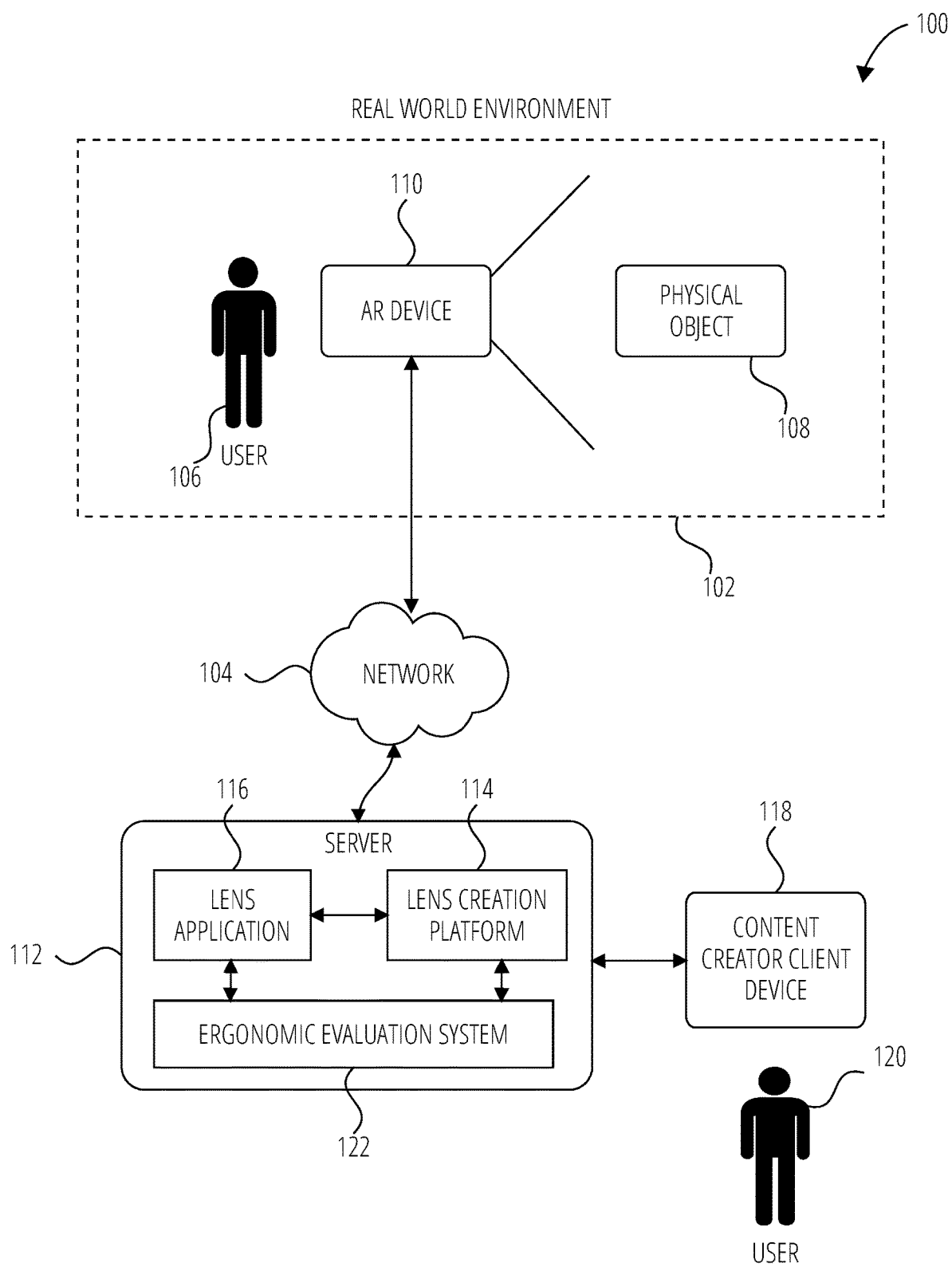
FIG. 1 is a block diagram illustrating a network environment for operating an AR device in accordance with one example embodiment.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural Components, such as modules) are optional and may be combined or subdivided, and operations (e.g., in a procedure, algorithm, or other function) may vary in sequence or be combined or subdivided.

The term "augmented reality" (AR) is used herein to refer to an interactive experience of a real-world environment where physical objects that reside in the real-world are "augmented" or enhanced by computer-generated digital content (also referred to as virtual content or synthetic content). AR can also refer to a system that enables a combination of real and virtual worlds, real-time interaction, and 3D registration of virtual and real objects. A user of an AR system perceives virtual content that appears to be attached or interact with a real-world physical object.

The term "virtual reality" (VR) is used herein to refer to a simulation experience of a virtual world environment that is completely distinct from the real-world environment. Computer-generated digital content is displayed in the virtual world environment. VR also refers to a system that enables a user of a VR system to be completely immersed in the virtual world environment and to interact with virtual objects presented in the virtual world environment.

The term "AR application" is used herein to refer to a computer-operated application that enables an AR experience. The term "VR application" is used herein to refer to a computer-operated application that enables a VR experience. The term "AR/VR application" refers to a computer-operated application that enables a combination of an AR experience or a VR experience.

The terms "visual tracking system" and "visual tracking device" are used herein to refer to a computer-operated application or system that enables a system to track visual features identified in images captured by one or more cameras of the visual tracking system. The visual tracking system builds a model of a real-world environment based on the tracked visual features. Non-limiting examples of the visual tracking system include: a visual Simultaneous Localization and Mapping system (VSLAM), and Visual Inertial Odometry (VIO) system. VSLAM can be used to build a target from an environment, or a scene based on one or more cameras of the visual tracking system. A VIO system (also referred to as a visual-inertial tracking system) determines a latest pose (e.g., position and orientation) of a device based on data acquired from multiple sensors (e.g., optical sensors, inertial sensors) of the device.

The term "Inertial Measurement Unit" (IMU) is used herein to refer to a device that can report on the inertial status of a moving body including the acceleration, velocity, orientation, and position of the moving body. An IMU enables tracking of movement of a body by integrating the acceleration and the angular velocity measured by the IMU. IMU can also refer to a combination of accelerometers and gyroscopes that can determine and quantify linear acceleration and angular velocity, respectively. The values obtained from the IMUs gyroscopes can be processed to obtain the pitch, roll, and heading of the IMU and, therefore, of the body with which the IMU is associated. Signals from the IMU's accelerometers also can be processed to obtain velocity and displacement of the IMU.

The term "three-degrees of freedom tracking system" (3DOF tracking system) is used herein to refer to a device that tracks rotational movement. For example, the 3DOF tracking system can track whether a user of a head-wearable device is looking left or right, rotating their head up or down, and pivoting left or right. However, the head-wearable device cannot use the 3DOF tracking system to determine whether the user has moved around a scene by moving in the physical world. As such, 3DOF tracking system may not be accurate enough to be used for positional signals. The 3DOF tracking system may be part of an AR/VR display device that includes IMU sensors. For example, the 3DOF tracking system uses sensor data from sensors such as accelerometers, gyroscopes, and magnetometers.

The term "six-degrees of freedom tracking system" (6DOF tracking system) is used herein to refer to a device that tracks rotational and translational motion. For example, the 6DOF tracking system can track whether the user has rotated their head and moved forward or backward, laterally or vertically and up or down. The 6DOF tracking system may include a SLAM system or a VIO system that relies on data acquired from multiple sensors (e.g., depth cameras, inertial sensors). The 6DOF tracking system analyzes data from the sensors to accurately determine the pose of the display device.

The term "ergonomics" refers to designing and arranging user interface elements of an AR application so that the AR user can interact most efficiently and safely. The term can also refer to the design characteristics of visual elements resulting from the application of the science of ergonomics.

Proper body postures during physical tasks are important to mitigate health issues such as musculoskeletal disorders (MSD). The present application describes an ergonomics evaluation system that provide feedback/guidelines at the AR application user interaction phase and the AR application development phase. In one example, the ergonomics evaluation system identifies joint angles (e.g., neck/trunk/wrist angles) inferred from CV algorithms and from sensors to evaluate ergonomic risk level and to provide guidance as to which joint angle(s) is at risk and the recommended length of continuous use.

The present application describes an ergonomics evaluation system for AR applications of an AR device. The ergonomics evaluation system uses joint angles (e.g., neck/trunk/wrist angles) inferred from CV algorithms and from sensors (either from real device or from simulation) to generate ergonomics feedback (e.g., evaluate ergonomics risk level). The ergonomics feedback can be used to identify optimal reach envelope of various group of users. The ergonomics feedback can also be provided to AR application creators/developers in guiding their development of their AR applications. In another example, the ergonomics feedback indicates ergonomics compatibility as an app rating criterion to help AR users to suitable applications. For example, the ergonomics feedback can include user categorization.

In one example embodiment, a method includes accessing user interface elements of an augmented reality application, accessing a plurality of user models and corresponding simulated augmented reality device sensor data for the plurality of user models, identifying simulated user interactions, from the plurality of user models, with a simulated augmented reality device operating the augmented reality application, based on the plurality of user models and corresponding simulated augmented reality device sensor data for the plurality of user models, applying a computer vision algorithm to the simulated user interactions, identifying user postures and user motions based on the simulated user interactions, and generating a first ergonomic feedback based on the user postures and the user motions.

As a result, one or more of the methodologies described herein facilitate solving the technical problem of power consumption by improving ergonomics to optimize user interactions with a device. The presently described method provides an improvement to an operation of the functioning of a computer by recommending configurations and configuring AR applications based on ergonomics feedback. As such, one or more of the methodologies described herein may obviate a need for certain efforts or computing resources. Examples of such computing resources include processor cycles, network traffic, memory usage, data storage capacity, power consumption, network bandwidth, and cooling capacity.

FIG. 1 is a network diagram illustrating a network environment 100 suitable for operating an AR device 110, a server 112, and a content creator client device 118 according to some example embodiments. The network environment 100 includes the AR device 110, the server 112, and the content creator client device 118, communicatively coupled to each other via a network 104. The AR device 110, content creator client device 118, and the server 112 may each be implemented in a computer system, in whole or in part, as described below with respect to FIG. 10. The server 112 may be part of a network-based system. For example, the network-based system may be or include a cloud-based server system that provides additional information, such as ergonomics evaluation to the AR device 110 and the content creator client device 118.

A user 106 operates the AR device 110. The user 106 may be a human user (e.g., a human being), a machine user (e.g., a computer configured by a software program to interact with the AR device 110), or any suitable combination thereof (e.g., a human assisted by a machine, or a machine supervised by a human). The user 106 is not part of the network environment 100 but is associated with the AR device 110.

The AR device 110 may be a computing device with a display such as a smartphone, a tablet computer, or a wearable computing device (e.g., watch or glasses). The computing device may be hand-held or may be removable mounted to a head of the user 106. In one example, the display may be a screen that displays what is captured with a camera of the AR device 110. In another example, the display of the device may be transparent such as in lenses of wearable computing glasses. In other examples, the display may be a transparent display such as a windshield of a car, plane, truck. In another example, the display may be non-transparent and wearable by the user to cover the field of vision of the user.

The user 106 operates an application of the AR device 110. The application may include an AR application configured to provide the user 106 with an experience triggered by a physical object 108, such as a two-dimensional physical object (e.g., a picture), a three-dimensional physical object (e.g., a statue), a location (e.g., at factory), or any references (e.g., perceived corners of walls or furniture, QR codes) in the real-world physical environment. For example, the user 106 may point a camera of the AR device 110 to capture an image of the physical object 108.

The AR device 110 includes a tracking system (not shown). The tracking system tracks the pose (e.g., position, orientation, and location) of the AR device 110 relative to the real-world environment 102 using optical sensors (e.g., depth-enabled 3D camera, image camera), inertia sensors (e.g., gyroscope, accelerometer), wireless sensors (Bluetooth, Wi-Fi), GPS sensor, and audio sensor to determine the location of the AR device 110 within the real world environment 102.

A user 120 operates the content creator client device 118 to create or develop an AR application using the server 112. The content creator client device 118 may be a computing device that communicates with the server 112 to assist the content creator client device 118 in developing the AR application.

In one example, the server 112 includes a lens application 116, a lens creation platform 114, an ergonomic evaluation system 122. The lens application 116 may be used to detect and identify the physical object 108 based on sensor data (e.g., image and depth data) from the AR device 110, determine a pose of the AR device 110 and the physical object 108 based on the sensor data. The lens application 116 can also generate a virtual object based on the pose of the AR device 110 and the physical object 108. The lens application 116 communicates the virtual object to the AR device 110. The object recognition, tracking, and AR rendering can be performed on either the AR device 110, the server 112, or a combination between the AR device 110 and the server 112.

The lens creation platform 114 enables the user 120 to generate/develop an AR application that when developed is accessible by the lens application 116. For example, the lens creation platform 114 enables the user 120 to identify or generate user interface elements, to select features and characteristics of the user interface elements, and to identify placements of the user interface elements.

The ergonomic evaluation system 122 identifies lens applications that are mapped to a user group. For example, the ergonomic evaluation system 122 identifies a lens application with ergonomics features that correspond to a user group of the user 106. When user searches for an ARP application, ergonomics evaluation result that belongs to the user's group are provided for reference.

In another example, when the user 106 interacts with the AR application, sensor data (images, IMU signals) are piped into a computer vision (CV) algorithms (e.g., SLAM, HT, etc.), the ergonomic evaluation system 122 uses these inputs to provide ergonomics recommendations (e.g., to remind them to reduce forward neck bending) to the user 106. The ergonomic evaluation system 122 thus provides ergonomics feedback (e.g., adjust posture, take a break) to the user 106 based on the usage data and sensor data from the AR device 110. Furthermore, the ergonomics evaluation together with user's time spent on the AR application is recorded, to categorize the user 106 as well as calibrate the ergonomic evaluation system 122.

In another example, the ergonomic evaluation system 122 accesses features of an AR application being developed with the lens creation platform 114. The features indicate placement location of user interface elements, user interface scale, handedness configuration, virtual object size, and so forth. For example, the ergonomic evaluation system 122 identifies usability of AR application with users of various capabilities and needs according to simulation of AR application interaction by different human models. The ergonomics evaluation can include suggestion of UI adjustment according to the target user group, and estimation of user time spending change on the AR application when features are adjusted (e.g., handedness adaptation +5%).

In another example, the ergonomic evaluation system 122 identifies physical tasks (e.g., mid-air gestures) when interacting with virtual objects, users' physical load, and provide ergonomics feedbacks to user 120 based on postures/motions inferred from CV algorithms.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 6. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 104 may be any network that enables communication between or among machines (e.g., server 112), databases, and devices (e.g., AR device 110, content creator client device 118). Accordingly, the network 104 may be a wired network, a wireless network (e.g., a mobile or cellular network), or any suitable combination thereof. The network 104 may include one or more portions that constitute a private network, a public network (e.g., the Internet), or any suitable combination thereof.

Figure 2:
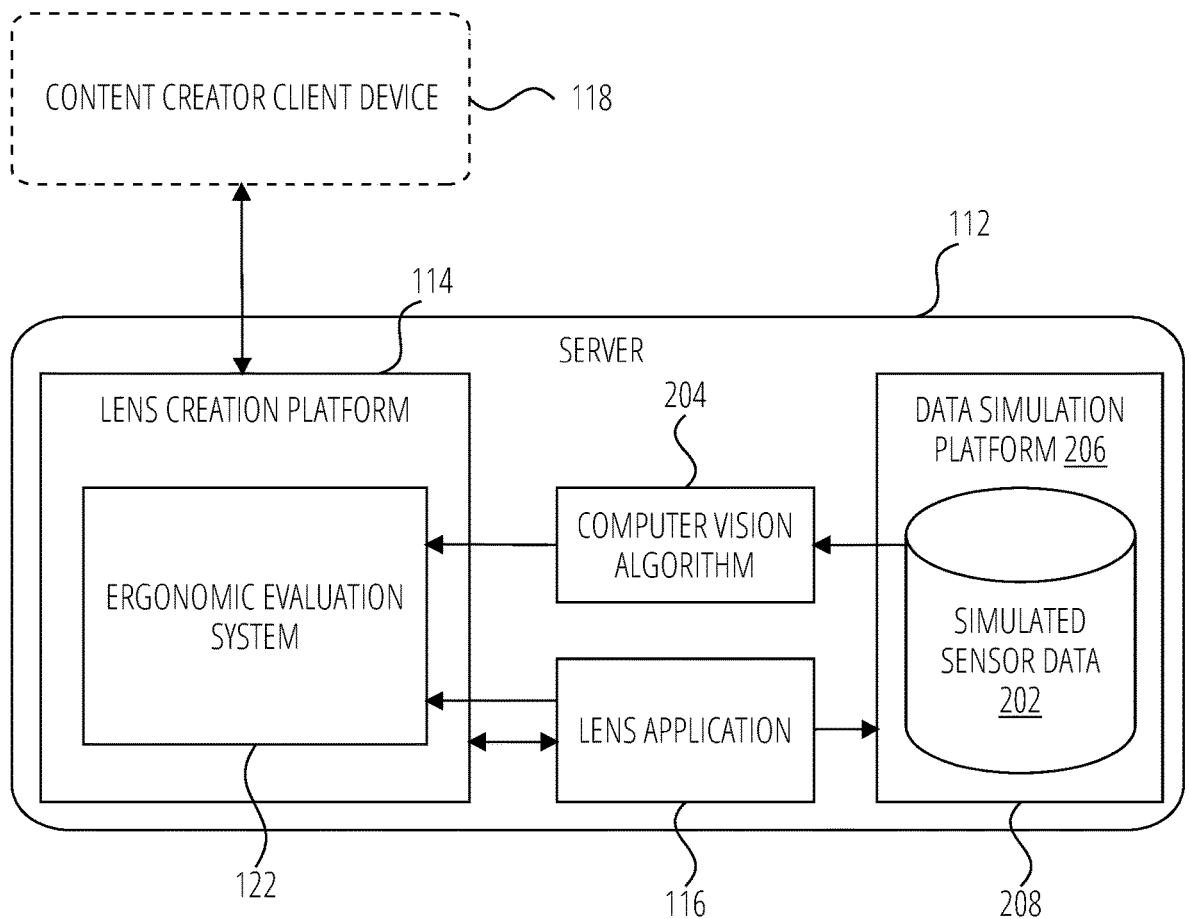
FIG. 2 is a block diagram illustrating a server in accordance with one example embodiment.

FIG. 2 is a block diagram illustrating the server 112 in accordance with one example embodiment. The server 112 includes the lens creation platform 114, a computer vision algorithm 204, the lens application 116, a data simulation platform 208. The content creator client device 118 communicates with the lens creation platform 114 to develop an AR application (e.g., lens application 116). The lens creation platform 114 includes a content creation tool with interactive user interface and AR application/lens application template to allow the content creators (e.g., user 120) to develop various applications for the AR device 110. For example, the lens creation platform 114 enables the content creator client device 118 to select, identify, and place graphical user interface elements of the lens application 116. The content creator client device 118 can further define events triggered based on user interactions with the graphical user interface elements.

The ergonomic evaluation system 122 simulates user interaction with the lens application 116 by applying simulated sensor data 202 from the data simulation platform 208. For example, the simulated sensor data 202 includes simulated sensor data of user operating AR devices. The simulated sensor data includes simulated movements of rigged 3D human models to estimate usability of the lens application 116 for different user groups. The simulated data is in the same format as the real data from sensors from the AR device 110, so that the same ergonomic evaluation system 122 can be used to infer the upper body fatigue of users over time. In another example, the ergonomic evaluation system 122 can be calibrated when the estimated fatigue level mismatches with the real usage time of lens application 116.

The computer vision algorithm 204 operates on the output from lens application 116 and the simulated sensor data 202 to identify postures/motions of a potential user operating the lens application 116. For example, the simulated sensor data (images, IMU signals) are piped into the computer vision algorithm 204 (e.g., SLAM, HT, etc.) to identify joint angles (e.g., neck/trunk/wrist angles). In another example, when the lens application 116 is developed, the data simulation platform 206 simulates usage by animating a 3D rigged human model and let it move accordingly using left/right/both hand(s) so that the designed user interaction is fulfilled. The data simulation platform 206 simulates using 3D human model in different height/arm length/gender to obtain various human motions. The ergonomic evaluation system 122 takes simulated data as input to infer the upper body fatigue of the user. In one example, the output from the computer vision algorithm 204 is fed into the ergonomic evaluation system 122 to generate an ergonomics evaluation or feedback. For example, the ergonomics feedback indicates ergonomic risk level and provides guidance as to which joint angle(s) is at risk and the recommended length of continuous use (for a particular user 106, or for each user group).

Figure 3:
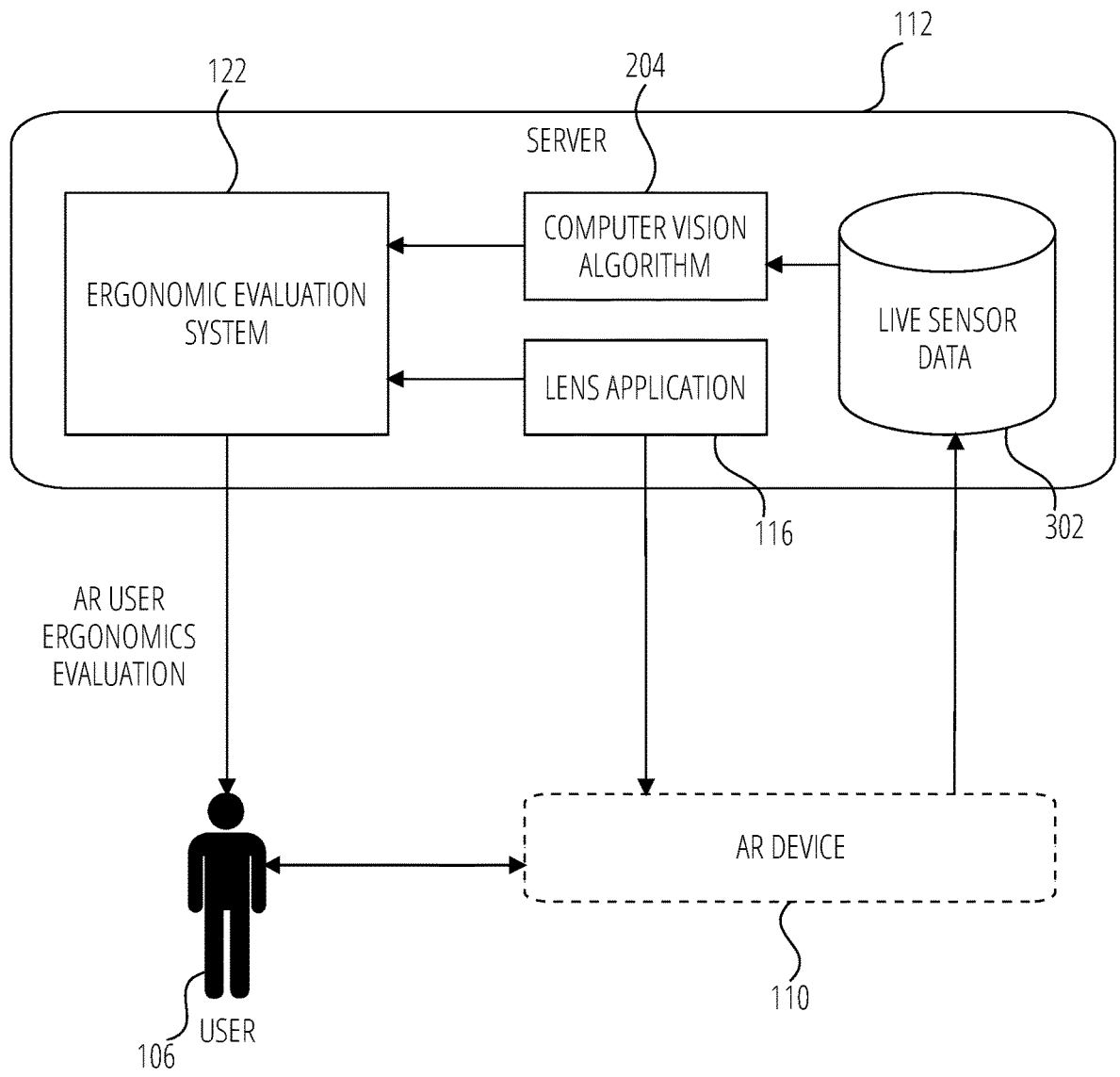
FIG. 3 is a block diagram illustrating a server in accordance with one example embodiment.

FIG. 3 is a block diagram illustrating the server 112 in accordance with one example embodiment. The server 112 includes the ergonomic evaluation system 122, the computer vision algorithm 204, the lens application 116, and live sensor data 302. The lens application 116 is uploaded to the AR device 110. In other words, the user 106 operates the lens application 116 with the AR device 110. When the user 106 is interacting with the lens application 116, IMU signals and images are captured by the AR device 110 and stored in the live sensor data 302. The live data (e.g., IMU signals, images from AR device 110) is fed into the computer vision algorithm 204 (e.g., SLAM/HT algorithm) to identify head poses/hand gestures. The ergonomic evaluation system 122 performs an ergonomics evaluation based on the head poses/hand gestures/various information of the user (e.g., handedness, height etc.) to infer the upper body fatigue of the user 106. The ergonomic evaluation system 122 provides AR user ergonomics evaluation to the user 106.

In other examples, the user 106 can obtain an ergonomics evaluation of an AR application for reference before the user 106 downloads various AR application from the server 112. Also, the ergonomic evaluation system 122 can provide real-time reminders when they are interacting with the lens application 116.

The ergonomics evaluation with real data plus AR application usage time can be stored in the live sensor data 302/simulated sensor data 202. The ergonomic evaluation system 122 categorizes the user into groups and can be further calibrated based on the live sensor data 302.

Figure 4:
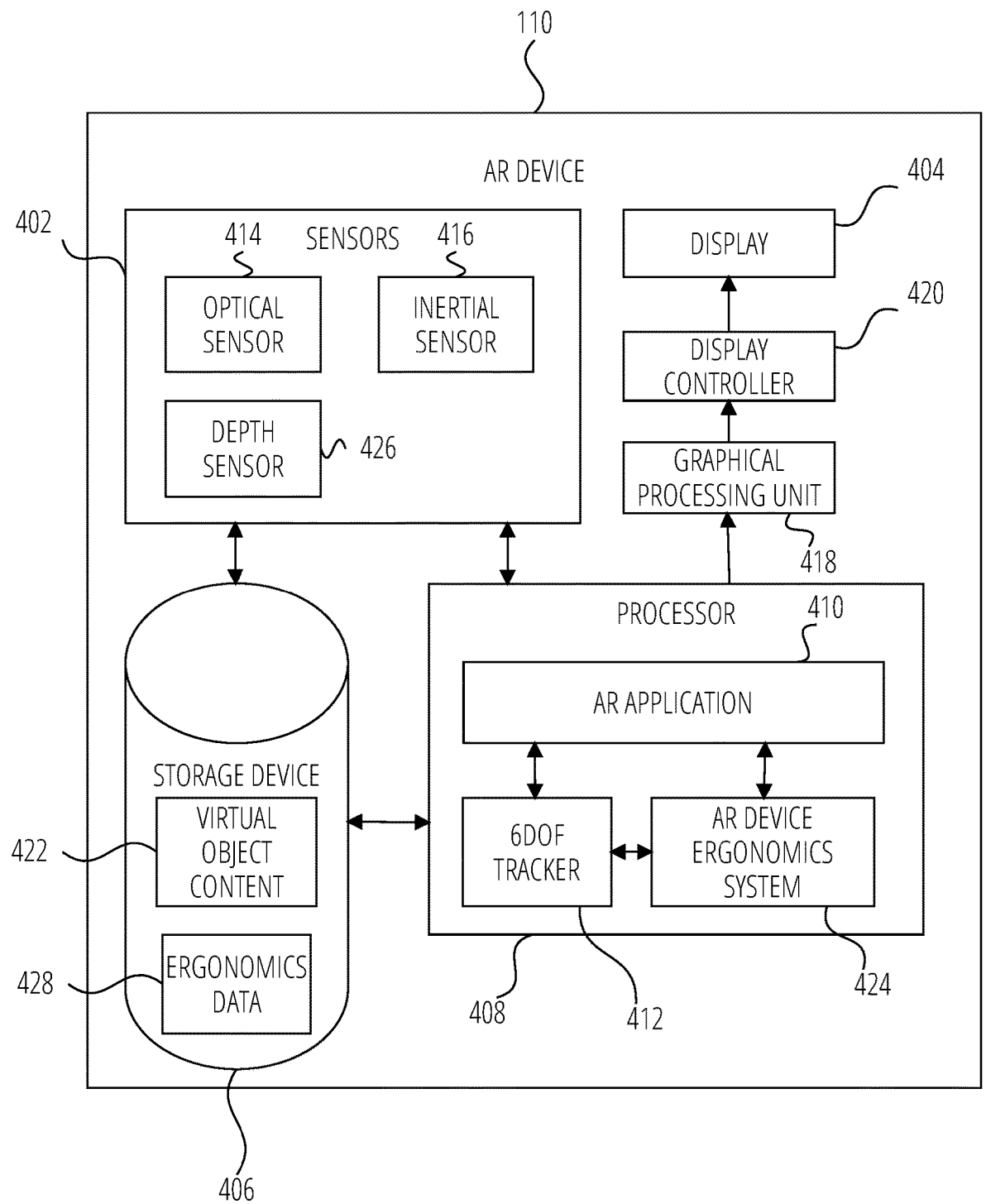
FIG. 4 is a block diagram illustrating an AR device in accordance with one example embodiment.

FIG. 4 is a block diagram illustrating modules (e.g., components) of the AR device 110, according to some example embodiments. The AR device 110 includes sensors 402, a display 404, a processor 408, a Graphical processing unit 418, a display controller 420, and a storage device 406. Examples of AR device 110 include a wearable computing device, a tablet computer, a navigational device, a portable media device, or a smart phone.

The sensors 402 include an optical sensor 414, an inertial sensor 416, and a depth sensor 426. The optical sensor 414 includes combination of a color camera, a thermal camera, a depth sensor, and one or multiple grayscales, global shutter tracking cameras. The inertial sensor 416 includes a combination of gyroscope, accelerometer, magnetometer. The depth sensor 426 includes a combination of structured-light sensor, a time-of-flight sensor, passive stereo sensor, and an ultrasound device, time-of-flight sensor. Other examples of sensors 402 include a proximity or location sensor (e.g., near field communication, GPS, Bluetooth, Wifi), an audio sensor (e.g., a microphone), or any suitable combination thereof. It is noted that the sensors 402 described herein are for illustration purposes and the sensors 402 are thus not limited to the ones described above.

The display 404 includes a screen or monitor configured to display images generated by the processor 408. In one example embodiment, the display 404 may be transparent or semi-transparent so that the user 106 can see through the display 404 (in AR use case). In another example, the display 404, such as a LCOS display, presents each frame of virtual content in multiple presentations.

The processor 408 includes an AR application 410, a 6DOF tracker 412, and an AR device ergonomics system 424. In one example, the AR application 410 includes the lens application 116. The AR application 410 detects and identifies a physical environment or the physical object 108 using computer vision. The AR application 410 retrieves a virtual object (e.g., 3D object model) based on the identified physical object 108 or physical environment. The display 404 displays the virtual object. The AR application 410 includes a local rendering engine that generates a visualization of a virtual object overlaid (e.g., superimposed upon, or otherwise displayed in tandem with) on an image of the physical object 108 captured by the optical sensor 414. A visualization of the virtual object may be manipulated by adjusting a position of the physical object 108 (e.g., its physical location, orientation, or both) relative to the optical sensor 414. Similarly, the visualization of the virtual object may be manipulated by adjusting a pose of the AR device 110 relative to the physical object 108.

The 6DOF tracker 412 estimates a pose of the AR device 110. For example, the 6DOF tracker 412 uses image data and corresponding inertial data from the optical sensor 414 and the inertial sensor 416 to track a location and pose of the AR device 110 relative to a frame of reference (e.g., real world environment 102). In one example, the 6DOF tracker 412 uses the sensor data to determine the three-dimensional pose of the AR device 110. The three-dimensional pose is a determined orientation and position of the AR device 110 in relation to the user's real-world environment 102. For example, the AR device 110 may use images of the user's real-world environment 102, as well as other sensor data to identify a relative position and orientation of the AR device 110 from physical objects in the real world environment 102 surrounding the AR device 110. The 6DOF tracker 412 continually gathers and uses updated sensor data describing movements of the AR device 110 to determine updated three-dimensional poses of the AR device 110 that indicate changes in the relative position and orientation of the AR device 110 from the physical objects in the real-world environment 102. The 6DOF tracker 412 provides the three-dimensional pose of the AR device 110 to the Graphical processing unit 418

The Graphical processing unit 418 includes a render engine (not shown) that is configured to render a frame of a 3D model of a virtual object based on the virtual content provided by the AR application 410 and the pose of the AR device 110. In other words, the Graphical processing unit 418 uses the three-dimensional pose of the AR device 110 to generate frames of virtual content to be presented on the display 404. For example, the Graphical processing unit 418 uses the three-dimensional pose to render a frame of the virtual content such that the virtual content is presented at an orientation and position in the display 404 to properly augment the user's reality. As an example, the Graphical processing unit 418 may use the three-dimensional pose data to render a frame of virtual content such that, when presented on the display 404, the virtual content overlaps with a physical object in the user's real-world environment 102. The Graphical processing unit 418 generates updated frames of virtual content based on updated three-dimensional poses of the AR device 110, which reflect changes in the position and orientation of the user in relation to physical objects in the user's real-world environment 102.

The Graphical processing unit 418 transfers the rendered frame to the display controller 420. The display controller 420 is positioned as an intermediary between the Graphical processing unit 418 and the display 404, receives the image data (e.g., rendered frame) from the Graphical processing unit 418 re-projects the frame (by performing a warping process) based on a latest pose of the AR device 110, and provides the reprojected frame to the display 404.

The AR device ergonomics system 424 communicates with the ergonomic evaluation system 122 of the server 112. In one example, the AR device ergonomics system 424 communicates data from sensors 402 to the AR device ergonomics system 424. In another example, the AR device ergonomics system 424 retrieves an ergonomics evaluation/feedback from the AR device ergonomics system 424 for a particular AR application. In other examples, the AR device ergonomics system 424 generates reminders to the user 106 based on the usage of the AR device 110, the live data from sensors 402, and the ergonomics feedback.

The storage device 406 stores virtual object content 422 and ergonomics data 428. The virtual object content 422 includes, for example, a database of visual references (e.g., images, QR codes) and corresponding virtual content (e.g., three-dimensional model of virtual objects). The ergonomics data 428 stores ergonomics feedback/ratings corresponding to AR applications.

Other augmentation data that may be stored within the storage device 406 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of an AR device 110 and then displayed on a screen of the AR device 110 with the modifications. This also includes modifications to stored content, such as video clips in a gallery that may be modified. For example, in AR device 110 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of AR device 110 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the AR device 110) and perform complex image manipulations locally on the AR device 110 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the AR device 110.

In some examples, a computer animation model to transform image data can be used by a system where a user may capture an image or video stream of the user (e.g., a selfie) using an AR device 110 having a neural network operating as part of the AR application 410 operating on the AR device 110. The transformation system operating within the AR device 110 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the AR device 110 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

Any one or more of the modules described herein may be implemented using hardware (e.g., a Processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 5:
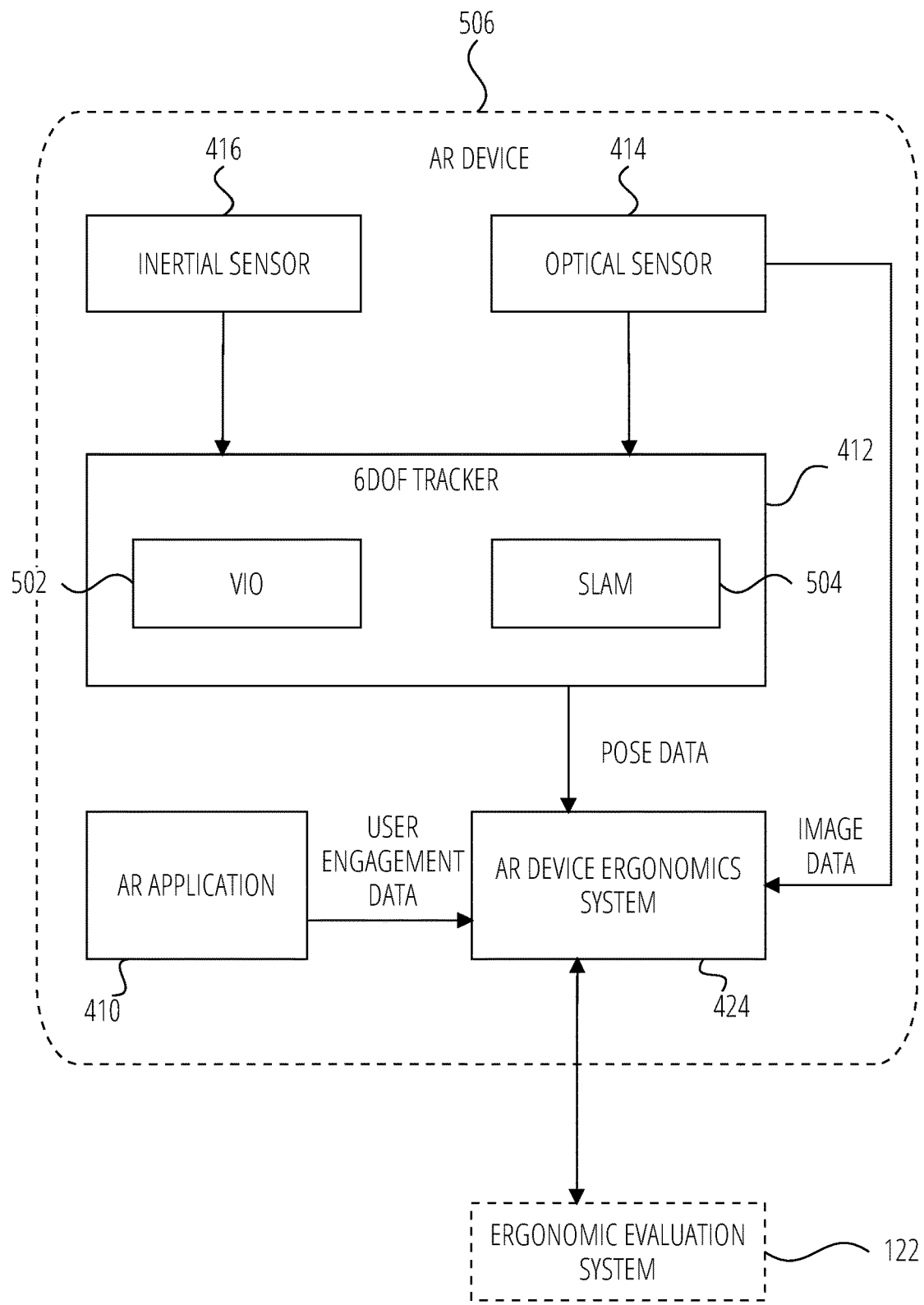
FIG. 5 is a block diagram illustrating an operation of an AR device ergonomics system in accordance with one example embodiment.

FIG. 5 is a block diagram illustrating an operation of the AR device ergonomics system 424 in accordance with one example embodiment. The 6DOF tracker 412 accesses inertial sensor data from the inertial sensor 416 and optical sensor data from the optical sensor 414.

The 6DOF tracker 412 determines a pose (e.g., location, position, orientation, inclination) of the AR device 110 relative to a frame of reference (e.g., real world environment 102). In one example embodiment, the 6DOF tracker 412 includes a VIO 502 and a SLAM 504. The 6DOF tracker 412 estimates the pose of the AR device 110 based on 3D maps of feature points from images captured with the optical sensor 414 and the inertial sensor data captured with the inertial sensor 416.

The 6DOF tracker 412 provides pose data to the AR device ergonomics system 424. The optical sensor 414 provides image data (e.g., a live stream image) to the AR device ergonomics system 424. The AR application provides user engagement data (e.g., how long the user 106 has operated the AR device 110 in a current session, gestures and motions of the user 106, operations on the AR application 410) to the AR device ergonomics system 424. The AR device ergonomics system 424 provides the live data (the pose data, the image data, and the user engagement data) to the ergonomic evaluation system 122. The AR device ergonomics system 424 receives ergonomics feedback from the ergonomic evaluation system 122.

Figure 6:
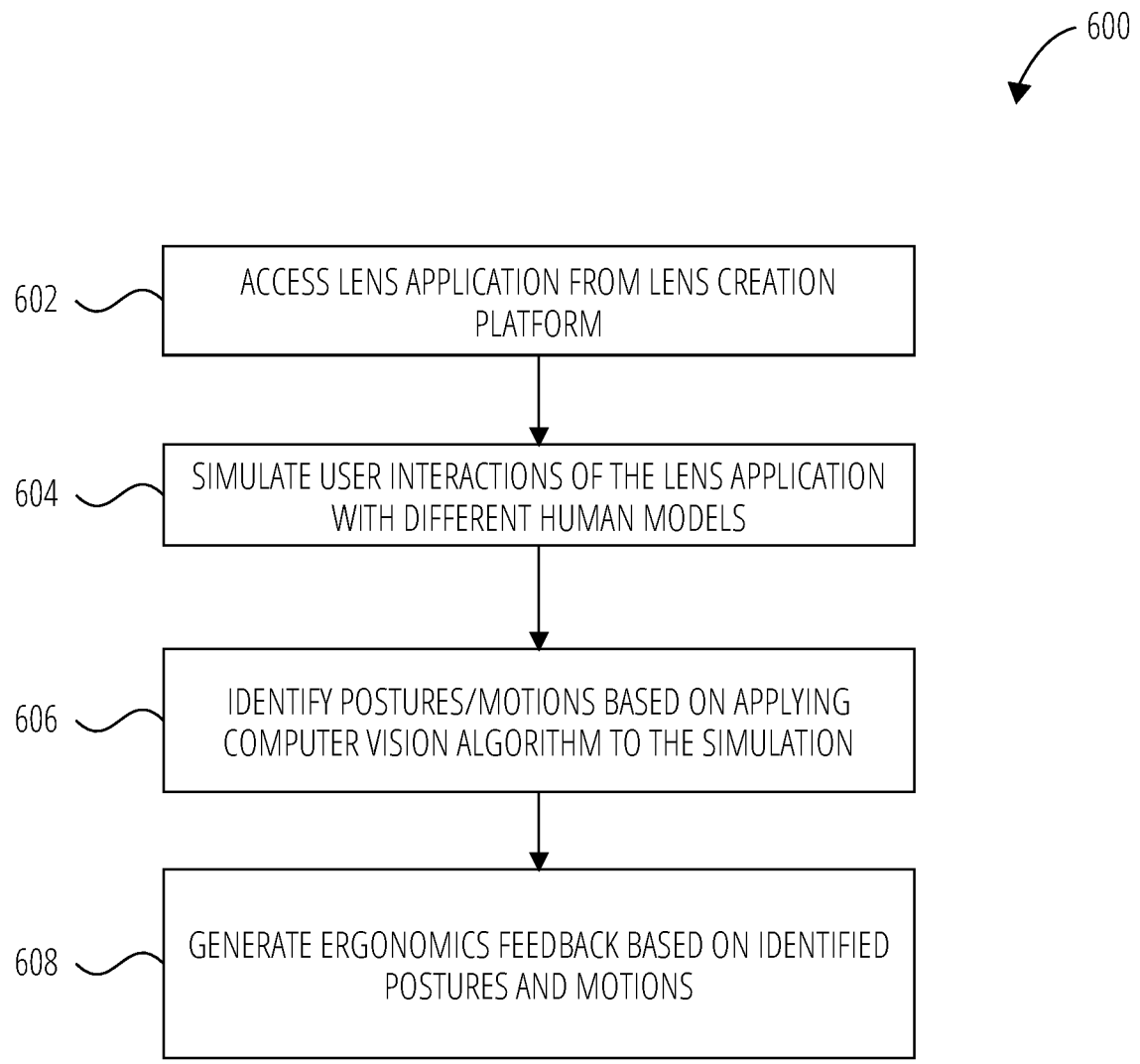
FIG. 6 is a flow diagram illustrating a method for generating ergonomics feedback in accordance with one example embodiment.

FIG. 6 illustrates an example method 600 for or detecting changes in a scene in accordance with one example embodiment. Although the example method 600 depicts a particular sequence of operations, the sequence may be altered without departing from the scope of the present disclosure. For example, some of the operations depicted may be performed in parallel or in a different sequence that does not materially affect the function of the method 600. In other examples, different components of an example device or system that implements the method 600 may perform functions at substantially the same time or in a specific sequence.

Operations in the method 600 may be performed by the ergonomic evaluation system 122, using components (e.g., modules, engines) described above with respect to FIG. 2. Accordingly, the method 600 is described by way of example with reference to the ergonomic evaluation system 122. However, it shall be appreciated that at least some of the operations of the method 600 may be deployed on various other hardware configurations or be performed by similar components residing elsewhere.

According to some examples, the method includes the ergonomic evaluation system 122 accessing the lens application 116 from the lens creation platform 114 at block 602.

According to some examples, the method includes simulating user interactions of the lens application 116 with different human models at block 604.

According to some examples, the method includes identifying postures/motions based on applying computer vision algorithm to the simulation at block 606.

According to some examples, the method includes generating ergonomics feedback based on identified postures and motions at block 608.

Figure 7:
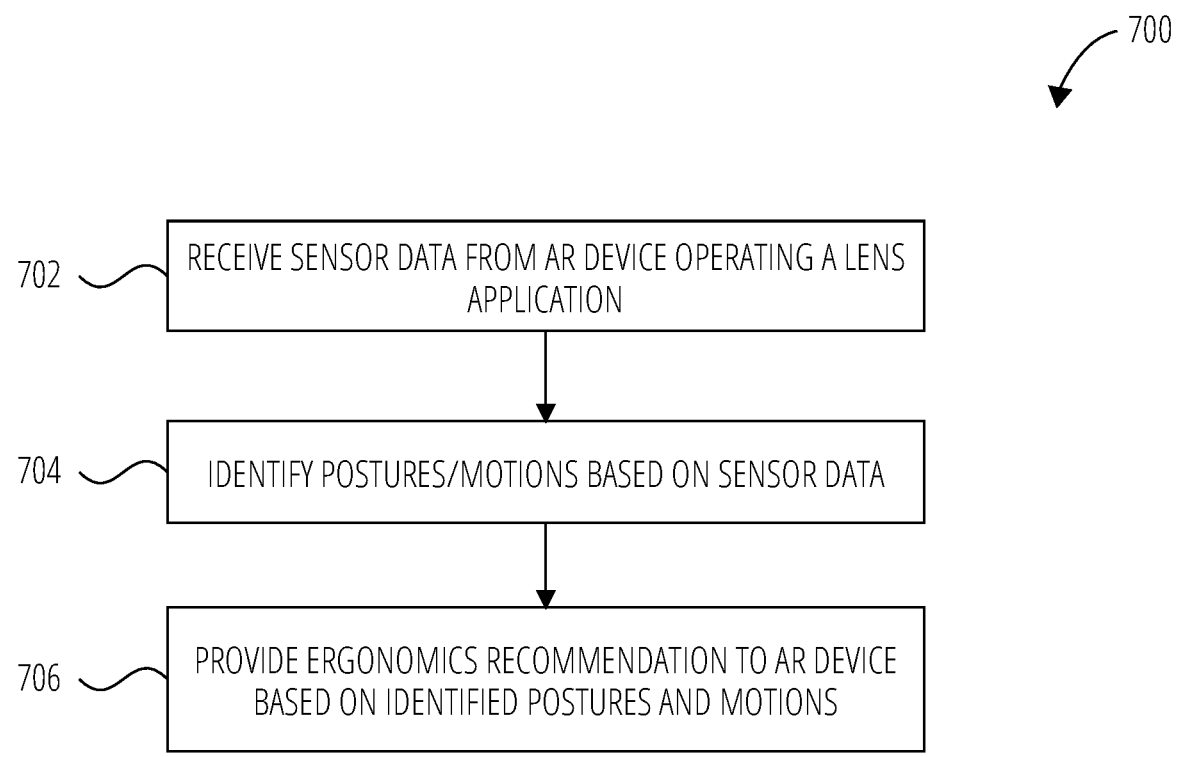
FIG. 7 is a flow diagram illustrating a method for providing ergonomics recommendation in accordance with one example embodiment.

FIG. 7 illustrates an example method 700 for providing ergonomics recommendation. Although the example method 700 depicts a particular sequence of operations, the sequence may be altered without departing from the scope of the present disclosure. For example, some of the operations depicted may be performed in parallel or in a different sequence that does not materially affect the function of the method 700. In other examples, different components of an example device or system that implements the method 700 may perform functions at substantially the same time or in a specific sequence.

Operations in the method 700 may be performed by the ergonomic evaluation system 122, using components (e.g., modules, engines) described above with respect to FIG. 3. Accordingly, the method 700 is described by way of example with reference to the ergonomic evaluation system 122. However, it shall be appreciated that at least some of the operations of the method 700 may be deployed on various other hardware configurations or be performed by similar components residing elsewhere.

According to some examples, the method includes receiving sensor data from the AR device 110 operating a lens application at block 702.

According to some examples, the method includes identifying postures/motions based on sensor data at block 704.

According to some examples, the method includes providing ergonomics recommendation to the AR device 110 based on identified postures and motions at block 706.

System with Head-Wearable Apparatus

Figure 8:
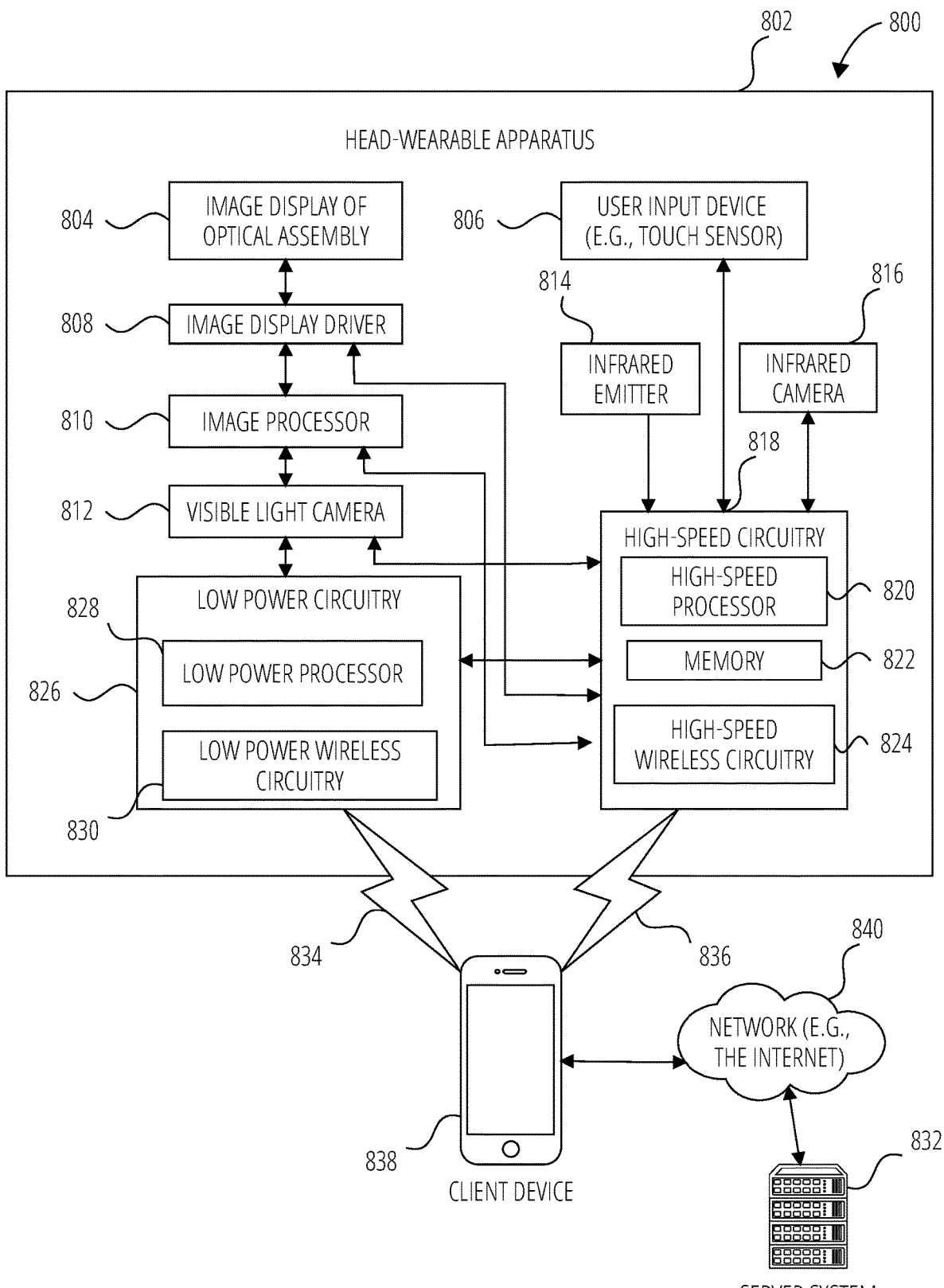
FIG. 8 illustrates a network environment in which a head-wearable device can be implemented according to one example embodiment.

FIG. 8 illustrates a network environment 800 in which the head-wearable apparatus 802 can be implemented according to one example embodiment. FIG. 8 is a high-level functional block diagram of an example head-wearable apparatus 802 communicatively coupled a mobile client device 838 and a server system 832 via various network 840.

head-wearable apparatus 802 includes a camera, such as at least one of visible light camera 812, infrared emitter 814 and infrared camera 816. The client device 838 can be capable of connecting with head-wearable apparatus 802 using both a communication 834 and a communication 836. client device 838 is connected to server system 832 and network 840. The network 840 may include any combination of wired and wireless connections.

The head-wearable apparatus 802 further includes two image displays of the image display of optical assembly 804. The two include one associated with the left lateral side and one associated with the right lateral side of the head-wearable apparatus 802. The head-wearable apparatus 802 also includes image display driver 808, image processor 810, low-power low power circuitry 826, and high-speed circuitry 818. The image display of optical assembly 804 are for presenting images and videos, including an image that can include a graphical user interface to a user of the head-wearable apparatus 802.

The image display driver 808 commands and controls the image display of the image display of optical assembly 804. The image display driver 808 may deliver image data directly to the image display of the image display of optical assembly 804 for presentation or may have to convert the image data into a signal or data format suitable for delivery to the image display device. For example, the image data may be video data formatted according to compression formats, such as H. 264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like.

As noted above, head-wearable apparatus 802 includes a frame and stems (or temples) extending from a lateral side of the frame. The head-wearable apparatus 802 further includes a user input device 806 (e.g., touch sensor or push button) including an input surface on the head-wearable apparatus 802. The user input device 806 (e.g., touch sensor or push button) is to receive from the user an input selection to manipulate the graphical user interface of the presented image.

The components shown in FIG. 8 for the head-wearable apparatus 802 are located on one or more circuit boards, for example a PCB or flexible PCB, in the rims or temples. Alternatively, or additionally, the depicted components can be located in the chunks, frames, hinges, or bridge of the head-wearable apparatus 802. Left and right can include digital camera elements such as a complementary metal-oxide-semiconductor (CMOS) image sensor, charge coupled device, a camera lens, or any other respective visible or light capturing elements that may be used to capture data, including images of scenes with unknown objects.

The head-wearable apparatus 802 includes a memory 822 which stores instructions to perform a subset or all of the functions described herein. memory 822 can also include storage device.

As shown in FIG. 8, high-speed circuitry 818 includes high-speed processor 820, memory 822, and high-speed wireless circuitry 824. In the example, the image display driver 808 is coupled to the high-speed circuitry 818 and operated by the high-speed processor 820 in order to drive the left and right image displays of the image display of optical assembly 804. high-speed processor 820 may be any processor capable of managing high-speed communications and operation of any general computing system needed for head-wearable apparatus 802. The high-speed processor 820 includes processing resources needed for managing high-speed data transfers on communication 836 to a wireless local area network (WLAN) using high-speed wireless circuitry 824. In certain examples, the high-speed processor 820 executes an operating system such as a LINUX operating system or other such operating system of the head-wearable apparatus 802 and the operating system is stored in memory 822 for execution. In addition to any other responsibilities, the high-speed processor 820 executing a software architecture for the head-wearable apparatus 802 is used to manage data transfers with high-speed wireless circuitry 824. In certain examples, high-speed wireless circuitry 824 is configured to implement Institute of Electrical and Electronic Engineers (IEEE) 802.11 communication standards, also referred to herein as Wi-Fi. In other examples, other high-speed communications standards may be implemented by high-speed wireless circuitry 824.

The low power wireless circuitry 830 and the high-speed wireless circuitry 824 of the head-wearable apparatus 802 can include short range transceivers (Bluetooth™) and wireless wide, local, or wide area network transceivers (e.g., cellular or WiFi). The client device 838, including the transceivers communicating via the communication 834 and communication 836, may be implemented using details of the architecture of the head-wearable apparatus 802, as can other elements of network 840.

The memory 822 includes any storage device capable of storing various data and applications, including, among other things, camera data generated by the left and right, infrared camera 816, and the image processor 810, as well as images generated for display by the image display driver 808 on the image displays of the image display of optical assembly 804. While memory 822 is shown as integrated with high-speed circuitry 818, in other examples, memory 822 may be an independent standalone element of the head-wearable apparatus 802. In certain such examples, electrical routing lines may provide a connection through a chip that includes the high-speed processor 820 from the image processor 810 or low power processor 828 to the memory 822. In other examples, the high-speed processor 820 may manage addressing of memory 822 such that the low power processor 828 will boot the high-speed processor 820 any time that a read or write operation involving memory 822 is needed.

As shown in FIG. 8, the low power processor 828 or high-speed processor 820 of the head-wearable apparatus 802 can be coupled to the camera (visible light camera 812; infrared emitter 814, or infrared camera 816), the image display driver 808, the user input device 806 (e.g., touch sensor or push button), and the memory 822.

The head-wearable apparatus 802 is connected with a host computer. For example, the head-wearable apparatus 802 is paired with the client device 838 via the communication 836 or connected to the server system 832 via the network 840. server system 832 may be one or more computing devices as part of a service or network computing system, for example, that include a processor, a memory, and network communication interface to communicate over the network 840 with the client device 838 and head-wearable apparatus 802.

The client device 838 includes a processor and a network communication interface coupled to the processor. The network communication interface allows for communication over the network 840, communication 834 or communication 836. client device 838 can further store at least portions of the instructions for generating a binaural audio content in the client device 838's memory to implement the functionality described herein.

Output components of the head-wearable apparatus 802 include visual components, such as a display such as a liquid crystal display (LCD), a plasma display panel (PDP), a light emitting diode (LED) display, a projector, or a waveguide. The image displays of the optical assembly are driven by the image display driver 808. The output components of the head-wearable apparatus 802 further include acoustic components (e.g., speakers), haptic components (e.g., a vibratory motor), other signal generators, and so forth. The input components of the head-wearable apparatus 802, the client device 838, and server system 832, such as the user input device 806, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 802 may optionally include additional peripheral device elements. Such peripheral device elements may include biometric sensors, additional sensors, or display elements integrated with head-wearable apparatus 802. For example, peripheral device elements may include any I/O components including output components, motion components, position components, or any other such elements described herein.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over and communication 836 from the client device 838 via the low power wireless circuitry 830 or high-speed wireless circuitry 824.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Changes and modifications may be made to the disclosed embodiments without departing from the scope of the present disclosure. These and other changes or modifications are intended to be included within the scope of the present disclosure, as expressed in the following claims.

Figure 9:
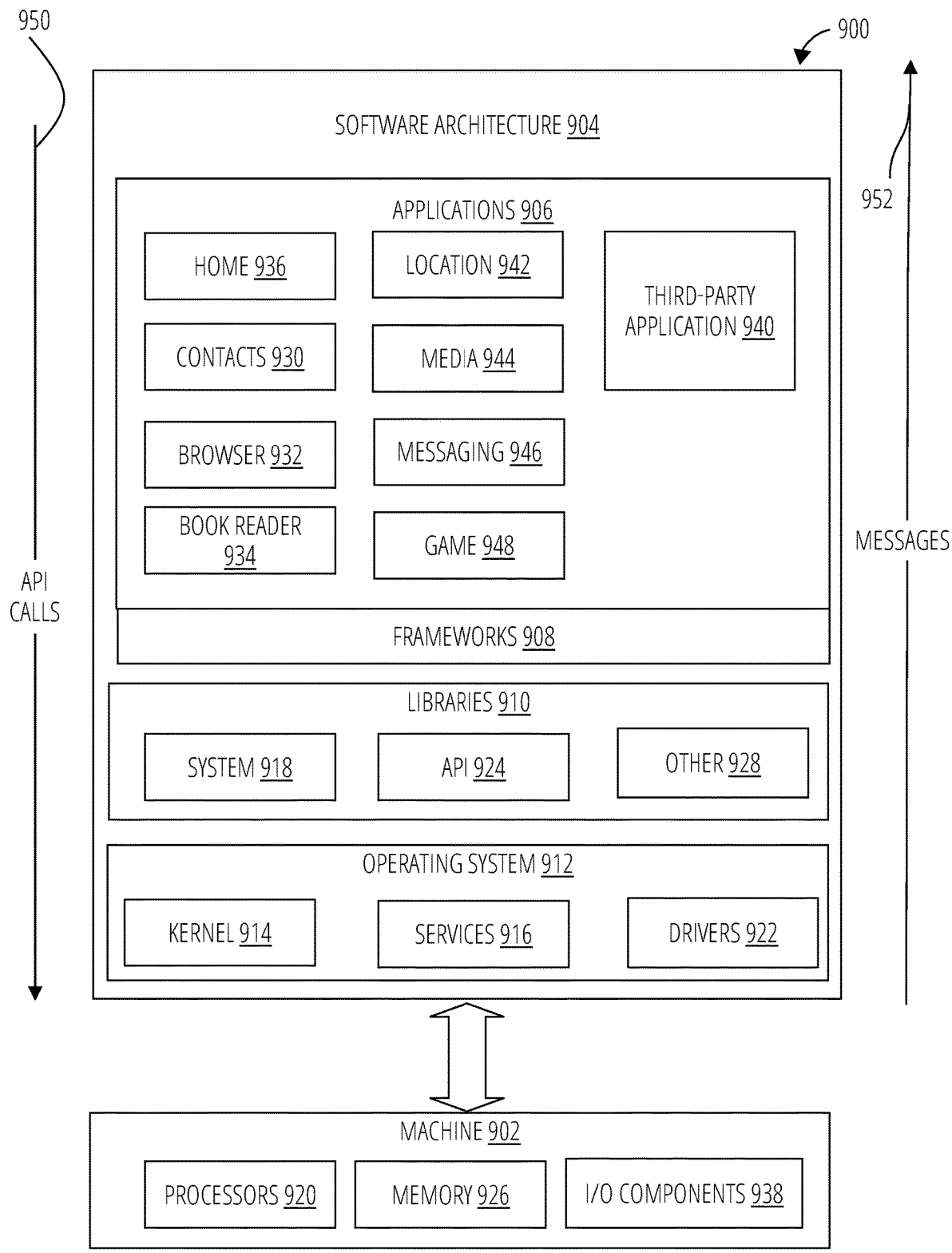
FIG. 9 is block diagram showing a software architecture within which the present disclosure may be implemented, according to an example embodiment.

FIG. 9 is a block diagram 900 illustrating a software architecture 904, which can be installed on any one or more of the devices described herein. The software architecture 904 is supported by hardware such as a machine 902 that includes Processors 920, memory 926, and I/O Components 938. In this example, the software architecture 904 can be conceptualized as a stack of layers, where each layer provides a particular functionality. The software architecture 904 includes layers such as an operating system 912, libraries 910, frameworks 908, and applications 906. Operationally, the applications 906 invoke API calls 950 through the software stack and receive messages 952 in response to the API calls 950.

The operating system 912 manages hardware resources and provides common services. The operating system 912 includes, for example, a kernel 914, services 916, and drivers 922. The kernel 914 acts as an abstraction layer between the hardware and the other software layers. For example, the kernel 914 provides memory management, Processor management (e.g., scheduling), Component management, networking, and security settings, among other functionality. The services 916 can provide other common services for the other software layers. The drivers 922 are responsible for controlling or interfacing with the underlying hardware. For instance, the drivers 922 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 910 provide a low-level common infrastructure used by the applications 906. The libraries 910 can include system libraries 918 (e.g., C standard library) that provide functions such as memory allocation functions, string manipulation functions, mathematic functions, and the like. In addition, the libraries 910 can include API libraries 924 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 910 can also include a wide variety of other libraries 928 to provide many other APIs to the applications 906.

The frameworks 908 provide a high-level common infrastructure that is used by the applications 906. For example, the frameworks 908 provide various graphical user interface (GUI) functions, high-level resource management, and high-level location services. The frameworks 908 can provide a broad spectrum of other APIs that can be used by the applications 906, some of which may be specific to a particular operating system or platform.

In an example embodiment, the applications 906 may include a home application 936, a contacts application 930, a browser application 932, a book reader application 934, a location application 942, a media application 944, a messaging application 946, a game application 948, and a broad assortment of other applications such as a third-party application 940. The applications 906 are programs that execute functions defined in the programs. Various programming languages can be employed to create one or more of the applications 906, structured in a variety of manners, such as object-oriented programming languages (e.g., Objective-C, Java, or C++) or procedural programming languages (e.g., C or assembly language). In a specific example, the third-party application 940 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 940 can invoke the API calls 950 provided by the operating system 912 to facilitate functionality described herein.

Figure 10:
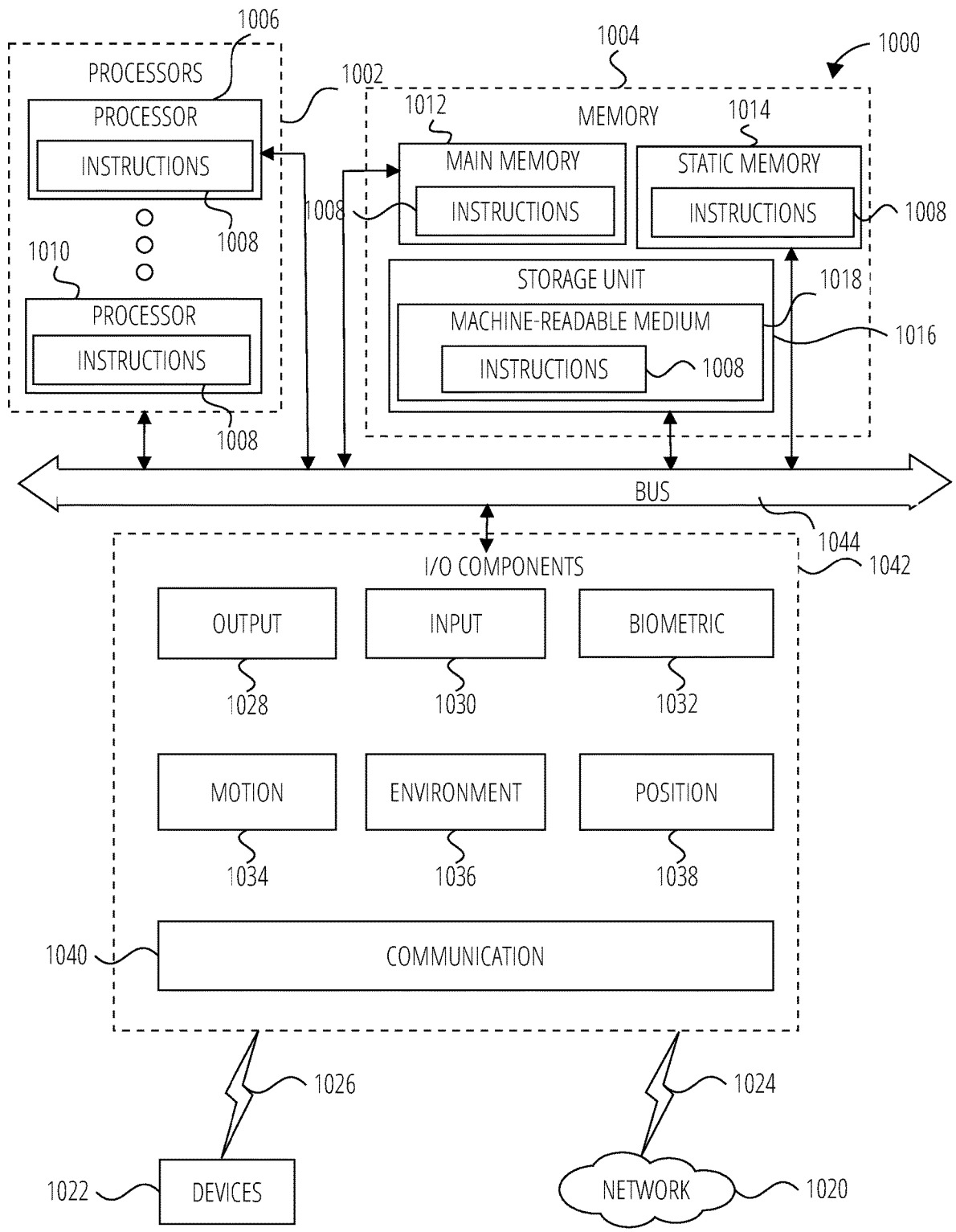
FIG. 10 is a diagrammatic representation of a machine in the form of a computer system within which a set of instructions may be executed for causing the machine to perform any one or more of the methodologies discussed herein, according to one example embodiment.

FIG. 10 is a diagrammatic representation of the machine 1000 within which instructions 1008 (e.g., software, a program, an application, an applet, an app, or other executable code) for causing the machine 1000 to perform any one or more of the methodologies discussed herein may be executed. For example, the instructions 1008 may cause the machine 1000 to execute any one or more of the methods described herein. The instructions 1008 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1008, sequentially or otherwise, that specify actions to be taken by the machine 1000. Further, while only a single machine 1000 is illustrated, the term "machine" shall also be taken to include a collection of machines that individually or jointly execute the instructions 1008 to perform any one or more of the methodologies discussed herein.

The machine 1000 may include Processors 1002, memory 1004, and I/O Components 1042, which may be configured to communicate with each other via a bus 1044. In an example embodiment, the Processors 1002 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 1006 and a Processor 1010 that execute the instructions 1008. The term "Processor" is intended to include multi-core Processors that may comprise two or more independent Processors (sometimes referred to as "cores") that may execute instructions contemporaneously. Although FIG. 10 shows multiple Processors 1002, the machine 1000 may include a single Processor with a single core, a single Processor with multiple cores (e.g., a multi-core Processor), multiple Processors with a single core, multiple Processors with multiples cores, or any combination thereof.

The memory 1004 includes a main memory 1012, a static memory 1014, and a storage unit 1016, both accessible to the Processors 1002 via the bus 1044. The main memory 1004, the static memory 1014, and storage unit 1016 store the instructions 1008 embodying any one or more of the methodologies or functions described herein. The instructions 1008 may also reside, completely or partially, within the main memory 1012, within the static memory 1014, within machine-readable medium 1018 within the storage unit 1016, within at least one of the Processors 1002 (e.g., within the Processor's cache memory), or any suitable combination thereof, during execution thereof by the machine 1000.

The I/O Components 1042 may include a wide variety of Components to receive input, provide output, produce output, transmit information, exchange information, capture measurements, and so on. The specific I/O Components 1042 that are included in a particular machine will depend on the type of machine. For example, portable machines such as mobile phones may include a touch input device or other such input mechanisms, while a headless server machine will likely not include such a touch input device. It will be appreciated that the I/O Components 1042 may include many other Components that are not shown in FIG. 10. In various example embodiments, the I/O Components 1042 may include output Components 1028 and input Components 1030. The output Components 1028 may include visual Components (e.g., a display such as a plasma display panel (PDP), a light emitting diode (LED) display, a liquid crystal display (LCD), a projector, or a cathode ray tube (CRT)), acoustic Components (e.g., speakers), haptic Components (e.g., a vibratory motor, resistance mechanisms), other signal generators, and so forth. The input Components 1030 may include alphanumeric input Components (e.g., a keyboard, a touch screen configured to receive alphanumeric input, a photo-optical keyboard, or other alphanumeric input Components), point-based input Components (e.g., a mouse, a touchpad, a trackball, a joystick, a motion sensor, or another pointing instrument), tactile input Components (e.g., a physical button, a touch screen that provides location and/or force of touches or touch gestures, or other tactile input Components), audio input Components (e.g., a microphone), and the like.

In further example embodiments, the I/O Components 1042 may include biometric Components 1032, motion Components 1034, environmental Components 1036, or position Components 1038, among a wide array of other Components. For example, the biometric Components 1032 include Components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion Components 1034 include acceleration sensor Components (e.g., accelerometer), gravitation sensor Components, rotation sensor Components (e.g., gyroscope), and so forth. The environmental Components 1036 include, for example, illumination sensor Components (e.g., photometer), temperature sensor Components (e.g., one or more thermometers that detect ambient temperature), humidity sensor Components, pressure sensor Components (e.g., barometer), acoustic sensor Components (e.g., one or more microphones that detect background noise), proximity sensor Components (e.g., infrared sensors that detect nearby objects), gas sensors (e.g., gas detection sensors to detection concentrations of hazardous gases for safety or to measure pollutants in the atmosphere), or other Components that may provide indications, measurements, or signals corresponding to a surrounding physical environment. The position Components 1038 include location sensor Components (e.g., a GPS receiver Component), altitude sensor Components (e.g., altimeters or barometers that detect air pressure from which altitude may be derived), orientation sensor Components (e.g., magnetometers), and the like.

Communication may be implemented using a wide variety of technologies. The I/O Components 1042 further include communication Components 1040 operable to couple the machine 1000 to a network 1020 or devices 1022 via a coupling 1024 and a coupling 1026, respectively. For example, the communication Components 1040 may include a network interface Component or another suitable device to interface with the network 1020. In further examples, the communication Components 1040 may include wired communication Components, wireless communication Components, cellular communication Components, Near Field Communication (NFC) Components, Bluetooth® Components (e.g., Bluetooth® Low Energy), Wi-Fi® Components, and other communication Components to provide communication via other modalities. The devices 1022 may be another machine or any of a wide variety of peripheral devices (e.g., a peripheral device coupled via a USB).

Moreover, the communication Components 1040 may detect identifiers or include Components operable to detect identifiers. For example, the communication Components 1040 may include Radio Frequency Identification (RFID) tag reader Components, NFC smart tag detection Components, optical reader Components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection Components (e.g., microphones to identify tagged audio signals). In addition, a variety of information may be derived via the communication Components 1040, such as location via Internet Protocol (IP) geolocation, location via Wi-Fi® signal triangulation, location via detecting an NFC beacon signal that may indicate a particular location, and so forth.

The various memories (e.g., memory 1004, main memory 1012, static memory 1014, and/or memory of the Processors 1002) and/or storage unit 1016 may store one or more sets of instructions and data structures (e.g., software) embodying or used by any one or more of the methodologies or functions described herein. These instructions (e.g., the instructions 1008), when executed by Processors 1002, cause various operations to implement the disclosed embodiments.

The instructions 1008 may be transmitted or received over the network 1020, using a transmission medium, via a network interface device (e.g., a network interface Component included in the communication Components 1040) and using any one of a number of well-known transfer protocols (e.g., hypertext transfer protocol (HTTP)). Similarly, the instructions 1008 may be transmitted or received using a transmission medium via the coupling 1026 (e.g., a peer-to-peer coupling) to the devices 1022.

As used herein, the terms "Machine-Storage Medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of Machine-Storage Media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "Machine-Storage Media," "computer-storage media," and "device-storage media" specifically exclude carrier waves, modulated data signals, and other such media, at least some of which are covered under the term "signal medium" discussed below.

The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1416 for execution by the machine 1400, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "Computer-Readable Medium," and "device-readable medium" mean the same thing and may be used interchangeably in this disclosure. The terms are defined to include both Machine-Storage Media and transmission media. Thus, the terms include both storage devices/media and carrier waves/modulated data signals.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

EXAMPLES

Described implementations of the subject matter can include one or more features, alone or in combination as illustrated below by way of example.

Example 1 is a method comprising: accessing user interface elements of an augmented reality application; accessing a plurality of user models and corresponding simulated augmented reality device sensor data for the plurality of user models; identifying simulated user interactions, from the plurality of user models, with a simulated augmented reality device operating the augmented reality application, based on the plurality of user models and corresponding simulated augmented reality device sensor data for the plurality of user models; applying a computer vision algorithm to the simulated user interactions; identifying user postures and user motions based on the simulated user interactions; and generating a first ergonomic feedback based on the user postures and the user motions.

Example 2 includes the method of example 1, wherein the first ergonomic feedback includes an ergonomics evaluation of the user interface elements of the augmented reality application.

Example 3 includes the method of example 2, wherein the ergonomics evaluation indicates suggested adjustments to the user interface elements, the suggested adjustments corresponding to a target user group of the augmented reality application.

Example 4 includes the method of example 3, wherein the suggested adjustments include a combination of user interface element scale, handedness configuration, and virtual object size.

Example 5 includes the method of example 3, wherein the ergonomic feedback includes estimated user time spending changes on the augmented reality application based on the suggested adjustments to the user interface elements.

Example 6 includes the method of example 1, further comprising: accessing sensor data from a user augmented reality device operated by a user, the user augmented reality device operating the augmented reality application, the sensor data comprising images captured by an image sensor of the user augmented reality device and inertial motion unit signals from an inertial motion unit device of the user augmented reality device; applying the computer vision algorithm to the sensor data to identify a posture and motions of the user; and generating a second ergonomic feedback to the user based on the posture and motions of the user, the second ergonomic feedback indicating suggested adjustments to the posture of the user while operating the user augmented reality device.

Example 7 includes the method of example 6, further comprising: recording the sensor data; and updating the plurality of user models and corresponding simulated augmented reality device sensor data for the plurality of user models with the sensor data.

Example 8 includes the method of example 6, further comprising: identifying a user group corresponding to the user based on the sensor data of the user augmented reality device and a profile of the user; and calibrating the plurality of user models and corresponding simulated augmented reality device sensor data for the plurality of user models based on the user group, the sensor data of the user augmented reality device, and the profile of the user.

Example 9 includes the method of example 8, further comprising: receiving an augmented reality application query request from the user augmented reality device; in response to receiving the augmented reality application query request, identifying at least one augmented reality application compatible with the user group corresponding to the user; and presenting, at the user augmented reality device, an ergonomic evaluation of the user interface elements of the at least one augmented reality application.

Example 10 includes the method of example 1, wherein each user model of the plurality of user models indicates a range of physical dimensions of a body part of a user.

Example 11 is a computing apparatus comprising: a processor; and a memory storing instructions that, when executed by the processor, configure the apparatus to: access user interface elements of an augmented reality application; access a plurality of user models and corresponding simulated augmented reality device sensor data for the plurality of user models; identify simulated user interactions, from the plurality of user models, with a simulated augmented reality device operating the augmented reality application, based on the plurality of user models and corresponding simulated augmented reality device sensor data for the plurality of user models; apply a computer vision algorithm to the simulated user interactions; identify user postures and user motions based on the simulated user interactions; and generate a first ergonomic feedback based on the user postures and the user motions.

Example 12 includes the computing apparatus of example 11, wherein the first ergonomic feedback includes an ergonomics evaluation of the user interface elements of the augmented reality application.

Example 13 includes the computing apparatus of example 12, wherein the ergonomics evaluation indicates suggested adjustments to the user interface elements, the suggested adjustments corresponding to a target user group of the augmented reality application.

Example 14 includes the computing apparatus of example 13, wherein the suggested adjustments include a combination of user interface element scale, handedness configuration, and virtual object size.

Example 15 includes the computing apparatus of example 13, wherein the ergonomic feedback includes estimated user time spend changes on the augmented reality application based on the suggested adjustments to the user interface elements.

Example 16 includes the computing apparatus of example 11, wherein the instructions further configure the apparatus to: access sensor data from a user augmented reality device operated by a user, the user augmented reality device operating the augmented reality application, the sensor data comprising images captured by an image sensor of the user augmented reality device and inertial motion unit signals from an inertial motion unit device of the user augmented reality device; apply the computer vision algorithm to the sensor data to identify a posture and motions of the user; and generate a second ergonomic feedback to the user based on the posture and motions of the user, the second ergonomic feedback indicating suggested adjustments to the posture of the user while operating the user augmented reality device.

Example 17 includes the computing apparatus of example 16, wherein the instructions further configure the apparatus to: record the sensor data; and update the plurality of user models and corresponding simulated augmented reality device sensor data for the plurality of user models with the sensor data.

Example 18 includes the computing apparatus of example 16, wherein the instructions further configure the apparatus to: identify a user group corresponding to the user based on the sensor data of the user augmented reality device and a profile of the user; and calibrate the plurality of user models and corresponding simulated augmented reality device sensor data for the plurality of user models based on the user group, the sensor data of the user augmented reality device, and the profile of the user.

Example 19 includes the computing apparatus of example 18, wherein the instructions further configure the apparatus to: receive an augmented reality application query request from the user augmented reality device; in response to receiving the augmented reality application query request, identify at least one augmented reality application compatible with the user group corresponding to the user; and present, at the user augmented reality device, an ergonomic evaluation of the user interface elements of the at least one augmented reality application.

Example 20 is a non-transitory computer-readable storage medium, the computer-readable storage medium including instructions that when executed by a computer, cause the computer to: access user interface elements of an augmented reality application; access a plurality of user models and corresponding simulated augmented reality device sensor data for the plurality of user models; identify simulated user interactions, from the plurality of user models, with a simulated augmented reality device operating the augmented reality application, based on the plurality of user models and corresponding simulated augmented reality device sensor data for the plurality of user models; apply a computer vision algorithm to the simulated user interactions; identify user postures and user motions based on the simulated user interactions; and generate a first ergonomic feedback based on the user postures and the user motions.

What is claimed is:

1. A method comprising:
    accessing user interface elements of an augmented reality application;
    accessing a plurality of user models and corresponding simulated augmented reality device sensor data for the plurality of user models;
    identifying simulated user interactions, from the plurality of user models, with a simulated augmented reality device operating the augmented reality application, based on the plurality of user models and corresponding simulated augmented reality device sensor data for the plurality of user models;
    applying a computer vision algorithm to the simulated user interactions;
    identifying user postures and user motions based on an output of the computer vision algorithm; and
    generating a first ergonomic feedback based on the user postures and the user motions.

2. The method of claim 1, wherein the first ergonomic feedback includes an ergonomics evaluation of the user interface elements of the augmented reality application.

3. The method of claim 2, wherein the ergonomics evaluation indicates suggested adjustments to the user interface elements, the suggested adjustments corresponding to a target user group of the augmented reality application.

4. The method of claim 3, wherein the suggested adjustments include a combination of user interface element scale, handedness configuration, and virtual object size.

5. The method of claim 3, wherein the ergonomic feedback includes estimated user time spending changes on the augmented reality application based on the suggested adjustments to the user interface elements.

6. The method of claim 1, further comprising:
    accessing sensor data from a user augmented reality device operated by a user, the user augmented reality device operating the augmented reality application, the sensor data comprising images captured by an image sensor of the user augmented reality device and inertial motion unit signals from an inertial motion unit device of the user augmented reality device;
    applying the computer vision algorithm to the sensor data to identify a posture and motions of the user; and
    generating a second ergonomic feedback to the user based on the posture and motions of the user, the second ergonomic feedback indicating suggested adjustments to the posture of the user while operating the user augmented reality device.

7. The method of claim 6, further comprising:
    recording the sensor data; and
    updating the plurality of user models and corresponding simulated augmented reality device sensor data for the plurality of user models with the sensor data.

8. The method of claim 6, further comprising:
    identifying a user group corresponding to the user based on the sensor data of the user augmented reality device and a profile of the user; and
    calibrating the plurality of user models and corresponding simulated augmented reality device sensor data for the plurality of user models based on the user group, the sensor data of the user augmented reality device, and the profile of the user.

9. The method of claim 8, further comprising:
    receiving an augmented reality application query request from the user augmented reality device;
    in response to receiving the augmented reality application query request, identifying at least one augmented reality application compatible with the user group corresponding to the user; and
    presenting, at the user augmented reality device, an ergonomic evaluation of the user interface elements of the at least one augmented reality application.

10. The method of claim 1, wherein each user model of the plurality of user models indicates a range of physical dimensions of a body part of a user.

11. A computing apparatus comprising:
    a processor; and
    a memory storing instructions that, when executed by the processor, configure the apparatus to:
    access user interface elements of an augmented reality application;
    access a plurality of user models and corresponding simulated augmented reality device sensor data for the plurality of user models;
    identify simulated user interactions, from the plurality of user models, with a simulated augmented reality device operating the augmented reality application, based on the plurality of user models and corresponding simulated augmented reality device sensor data for the plurality of user models;
    apply a computer vision algorithm to the simulated user interactions;
    identify user postures and user motions based on an output of the computer vision algorithm; and
    generate a first ergonomic feedback based on the user postures and the user motions.

12. The computing apparatus of claim 11, wherein the first ergonomic feedback includes an ergonomics evaluation of the user interface elements of the augmented reality application.

13. The computing apparatus of claim 12, wherein the ergonomics evaluation indicates suggested adjustments to the user interface elements, the suggested adjustments corresponding to a target user group of the augmented reality application.

14. The computing apparatus of claim 13, wherein the suggested adjustments include a combination of user interface element scale, handedness configuration, and virtual object size.

15. The computing apparatus of claim 13, wherein the ergonomic feedback includes estimated user time spend changes on the augmented reality application based on the suggested adjustments to the user interface elements.

16. The computing apparatus of claim 11, wherein the instructions further configure the apparatus to:
    access sensor data from a user augmented reality device operated by a user, the user augmented reality device operating the augmented reality application, the sensor data comprising images captured by an image sensor of the user augmented reality device and inertial motion unit signals from an inertial motion unit device of the user augmented reality device,
    apply the computer vision algorithm to the sensor data to identify a posture and motions of the user; and
    generate a second ergonomic feedback to the user based on the posture and motions of the user, the second ergonomic feedback indicating suggested adjustments to the posture of the user while operating the user augmented reality device.

17. The computing apparatus of claim 16, wherein the instructions further configure the apparatus to:
   record the sensor data; and
   update the plurality of user models and corresponding simulated augmented reality device sensor data for the plurality of user models with the sensor data.

18. The computing apparatus of claim 16, wherein the instructions further configure the apparatus to:
   identify a user group corresponding to the user based on the sensor data of the user augmented reality device and a profile of the user; and
   calibrate the plurality of user models and corresponding simulated augmented reality device sensor data for the plurality of user models based on the user group, the sensor data of the user augmented reality device, and the profile of the user.

19. The computing apparatus of claim 18, wherein the instructions further configure the apparatus to:
   receive an augmented reality application query request from the user augmented reality device;
   in response to receiving the augmented reality application query request, identify at least one augmented reality application compatible with the user group corresponding to the user; and
   present, at the user augmented reality device, an ergonomic evaluation of the user interface elements of the at least one augmented reality application.

20. A non-transitory computer-readable storage medium, the computer-readable storage medium including instructions that when executed by a computer, cause the computer to:
   access user interface elements of an augmented reality application;
   access a plurality of user models and corresponding simulated augmented reality device sensor data for the plurality of user models;
   identify simulated user interactions, from the plurality of user models, with a simulated augmented reality device operating the augmented reality application, based on the plurality of user models and corresponding simulated augmented reality device sensor data for the plurality of user models;
   apply a computer vision algorithm to the simulated user interactions;
   identify user postures and user motions based on an output of the computer vision algorithm; and
   generate a first ergonomic feedback based on the user postures and the user motions.

* * * * *

UNITED STATES PATENT AND TRADEMARK OFFICE
CERTIFICATE OF CORRECTION

| | | |
|---|---|---|
| PATENT NO. | : 12,315,089 B2 | Page 1 of 1 |
| APPLICATION NO. | : 18/069779 | |
| DATED | : May 27, 2025 | |
| INVENTOR(S) | : Xi et al. | |

It is certified that error appears in the above-identified patent and that said Letters Patent is hereby corrected as shown below:

In the Claims

In Column 26, Line 63, in Claim 16, delete "device," and insert --device;-- therefor Signed and Sealed this
Sixth Day of January, 2026

John A. Squires
*Director of the United States Patent and Trademark Office*